(12) United States Patent
Yamada et al.

(10) Patent No.: US 8,544,211 B2
(45) Date of Patent: Oct. 1, 2013

(54) DOOR SASH

(75) Inventors: Makoto Yamada, Kanagawa (JP);
Takayuki Okada, Kanagawa (JP)

(73) Assignee: Shiroki Corporation, Kanagawa (JP)

( * ) Notice: Subject to any disclaimer, the term of this patent is extended or adjusted under 35 U.S.C. 154(b) by 0 days.

(21) Appl. No.: 12/858,607

(22) Filed: Aug. 18, 2010

(65) Prior Publication Data

US 2011/0042997 A1    Feb. 24, 2011

(30) Foreign Application Priority Data

Aug. 21, 2009   (JP) .................................. 2009-192219

(51) Int. Cl.
*B60J 5/04* (2006.01)

(52) U.S. Cl.
USPC .............................. 49/502; 49/441

(58) Field of Classification Search
USPC ............. 49/502, 440, 441; 296/146.5, 146.2, 296/201
See application file for complete search history.

(56) References Cited

U.S. PATENT DOCUMENTS

| | | | |
|---|---|---|---|
| 4,934,101 A * | 6/1990 | Hannya et al. .................. | 49/502 |
| 5,095,655 A * | 3/1992 | Warren ........................... | 49/374 |
| 5,735,081 A * | 4/1998 | Yamanaka et al. .............. | 49/506 |
| 6,557,304 B2 * | 5/2003 | Ellis ................................ | 49/441 |
| 2003/0177702 A1 * | 9/2003 | Hock et al. ...................... | 49/502 |

FOREIGN PATENT DOCUMENTS

JP    2007-145282    6/2007

* cited by examiner

*Primary Examiner* — Katherine Mitchell
*Assistant Examiner* — Catherine A Kelly
(74) *Attorney, Agent, or Firm* — Finnegan, Henderson, Farabow, Garrett, Dunner, L.L.P.

(57) ABSTRACT

The invention relates to a door sash having a cross-sectional shape including a design portion and a hollow portion formed on an inboard side with respect to the design portion and connected to the design portion, and is intended to provide a door sash which achieves weight reduction. The hollow portion is an extrusion mold of light metal, the design portion is a product having a variable cross-sectional shape in which the shape in the direction of the width of a vehicle is increased in length as it gets close to a waist line of a door, and the hollow portion is integrated with the design portion. The door sash further includes: a glass run holder positioned on an outboard side with respect to the hollow portion and configured to hold a glass run which a window glass comes into abutment with, the glass run holder being adjacent to the design portion, and a bracket which connects the glass run holder and the hollow portion.

5 Claims, 4 Drawing Sheets

DOOR SASH

BACKGROUND OF THE INVENTION

1. Technical Field

The present invention relates to a door sash having a cross-sectional shape including a design portion formed on an outboard side and having a design surface, and a hollow portion formed on an inboard side with respect to the design portion and connected to the design portion.

2. Description of the Related Art

Referring now to FIG. 3, a sash door will be described. As illustrated, a door sash 3 is provided on an upper portion of a sash door 1 with respect to a waist line (a line where a door glass and a door panel come in contact with each other) WL. The door sash 3 is mounted on an inner panel, not shown, which opposes an outer panel 5 by means of welding or the like. The door sash 3 is generally manufactured by roll-forming a steel product.

Referring in turn to FIG. 4, a cross-sectional shape of the door sash 3 will be described. FIG. 4 is a cross-sectional view taken along the line A-A in FIG. 3.

The cross section of the door sash 3 includes a design portion 7 being formed on the outboard side and having a design surface 7a, a glass run holder 9 formed on the inboard side with respect to the design portion 7 and configured to hold a glass run which a window glass comes into abutment with, and a hollow portion 11 formed on the inboard side with respect to the glass run holder 9. In addition, a weather strip holder 13 which is located adjacent to the glass run holder 9 for holding a weather strip which comes into abutment with a body to prevent entry of rain water or the like from the outside into a vehicle is formed. The door sash 3 in this configuration is manufactured by roll-forming a piece of steel plate.

In recent years, manufacturing the door sash 3 by extrusion molding using light alloy such as aluminum alloy for reducing the weight of the door sash 3 is also proposed (see JP-A-2007-145282).

When the vehicle travels at a high velocity, a force in the direction of being sucked out of the vehicle is applied to a door. When such a force acts on the door, a significant bending moment which increases as it gets close to the waist line WL is generated in the door sash 3. Therefore, in the vehicle which is capable of traveling at high velocities, bending rigidity of the door sash 3 is preferably increased as it gets close to the waist line WL.

As a cross-sectional shape of the door sash 3 which realizes the high rigidity, there is a variable cross-sectional shape which increases gradually in distance between the design portion 7 and the hollow portion 11 (shown by 1 in FIG. 4) as it gets close to the waist line WL, that is, gradually increases in thickness in the vehicle width direction.

However, when manufacturing the variable cross-sectional shape as described above by the roll-forming of the steel plate, there arises a problem of weight increase.

In contrast, in the extrusion molding of light alloy, such variable cross-sectional shape cannot be manufactured.

In view of such problems, it is an object of the present invention to provide a door sash which achieves weigh reduction while having a variable cross-sectional shape.

In order to solve the above-described problem, the present invention provides a door sash having a cross-sectional shape including: a design portion; and a hollow portion formed on an inboard side with respect to the design portion and connected to the design portion; wherein the hollow portion is an extrusion mold formed of light metal, the design portion is a product having a variable cross-sectional shape in which the shape in the vehicle width direction is increased in length as it gets close to a waist line of a door, and the hollow portion and the design portion are integrated.

In this configuration, with the door sash having the hollow portion being the extrusion mold formed of light metal, the design portion being the product having the variable cross-sectional shape molded in such a manner that the shape in the direction of the width of the vehicle is increased in length as it gets close to the waist line of the door, and the hollow portion and the design portion integrated with respect to each other, weight reduction with the variable cross-sectional shape is achieved.

DESCRIPTION OF THE PREFERRED EMBODIMENT

Figure 1:
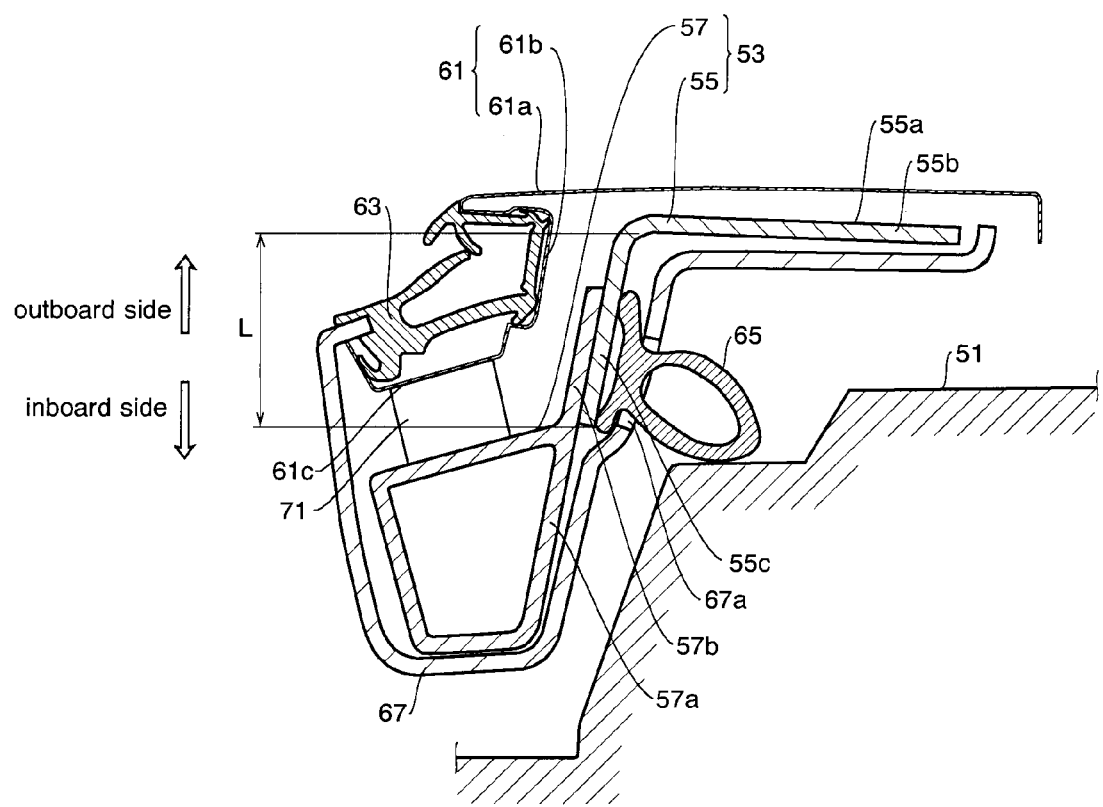
FIG. 1 is a cross-sectional view of a door sash according to an embodiment corresponding to a cross-section taken along the line A-A in FIG. 3.
Figure 2:
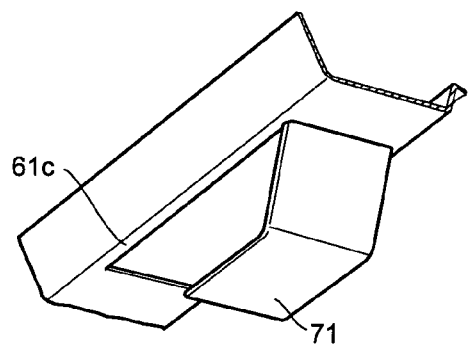
FIG. 2 is a perspective view for explaining a bracket shown in FIG. 1.
Figure 3:
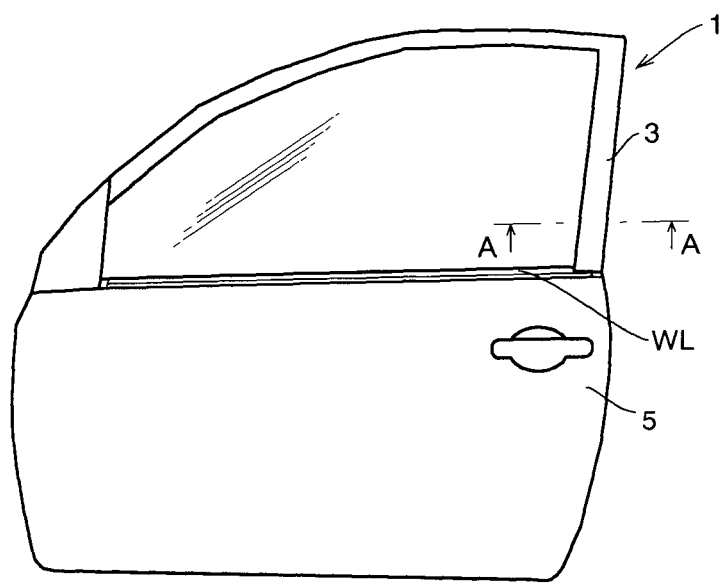
FIG. 3 is a drawing for explaining a sash door.
Figure 4:
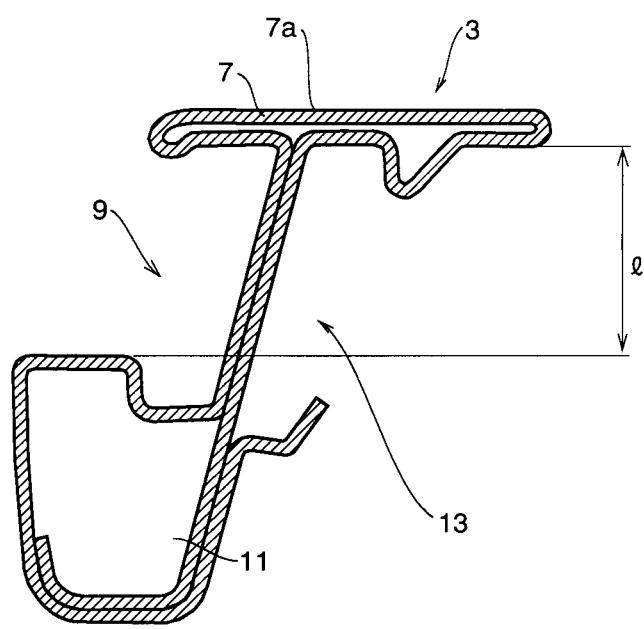
FIG. 4 is a cross-sectional view taken along the line A-A in FIG. 3.

Referring now to the drawings, an embodiment of the invention will be described. FIG. 1 is a cross-sectional view of a door sash according to the embodiment corresponding to a cross section taken along the line A-A in FIG. 3, and FIG. 2 is a perspective view for explaining a bracket in FIG. 1.

In the drawing, reference numeral 51 designates a center pillar of a body.

A door sash 53 includes a design portion 55 formed on an outboard side and having a design surface 55a, and a hollow portion 57 formed on an inboard side with respect to the design portion 55 and connected to the design portion 55.

The design portion 55 includes a design portion body 55b having the design surface 55a, and a variable cross-sectional portion 55c being bent from the design portion body 55b in the vehicle width direction and extending toward the inboard side.

The hollow portion 57 includes a hollow portion body 57a having a closed cross section, and a mounting portion 57b extending from the hollow portion body 57a toward the outboard side in the vehicle width direction.

In this embodiment, the hollow portion 57 is an extrusion mold formed of aluminum alloy. The design portion 55 is a press mold of a steel product.

The variable cross-sectional portion 55c of the design portion 55 is formed so as to increase in length in the vehicle width direction (L in the drawing) as it gets close to a waist line of a door.

The mounting portion 57b of the hollow portion 57 and the variable cross-sectional portion 55c of the design portion 55 are joined by means of welding, rivet or the like, and are integrated with each other.

The outboard side of the door sash 53 is covered with a garnish 61. The garnish 61 includes a garnish body 61a configured to cover the design surface 55a, and a glass run holder 61b positioned on the outboard side with respect to the hollow portion 57, formed adjacent to the design portion 55, and configured to hold a glass run 63 which a window glass comes into abutment with.

Mounted on the variable cross-sectional portion 55c of the design portion 55 of the door sash 53 is a weather strip 65 which comes into abutment with the center pillar 51 to prevent entry of rain water or the like from outside into a vehicle.

The inboard side of the door sash 53 is covered with an inner garnish 67. The inner garnish 67 is formed with a slit 67a which allows insertion of the weather strip 65.

The glass run holder 61b formed on the garnish 61 supports the garnish body 61a of the garnish 61 in a cantilevered manner. Therefore, in order to support the glass run holder 61b stably, another supporting structure is required.

In this embodiment, a bracket 71 configured to support the glass run holder 61b is provided between the glass run holder 61b and the hollow portion body 57a of the hollow portion 57. As shown in FIG. 1 and FIG. 2, the bracket 71 is formed into a tongue-shaped strip which is formed by applying a half-cut drawing on a bottom portion 61c of the glass run holder 61b opposing the hollow portion body 57a so as to come into abutment with the hollow portion body 57a.

In the configuration as described above, the following effects are obtained.

(1) With the door sash having the hollow portion 57 being the extrusion mold formed of aluminum alloy, the design portion 55 being the product having the variable cross-sectional shape molded in such a manner that the variable cross-sectional portion 55c is increased in length in the vehicle width direction as it gets close to the waist line of the door, and the hollow portion 57 and the design portion 55 integrated with respect to each other, weight reduction with the variable cross-sectional shape is achieved.

(2) With the provision of the glass run holder 61b configured to hold the glass run 63 which the window glass comes into abutment with and positioned on the outboard side with respect to the hollow portion 57 adjacent to the design portion 55, and the bracket 71 configured to support the glass run holder 61b between the glass run holder 61b and the hollow portion 57, the glass run holder 61b is stably supported.

(3) With the bracket 71 integrated with the glass run holder 61b, assembly is simplified.

(4) With the bracket 71 being formed by the half-cut drawing of the glass run holder 61b, the size of the tongue-shaped strip can be changed easily. Therefore, even though the design portion 55 is the product having the variable cross-sectional shape and hence the distance between the glass run holder 61b and the hollow portion 57 changes, the glass run holder 61b can be supported stably.

What is claimed is:

1. A door sash for a door of a motor vehicle, the vehicle having a horizontal width-wise direction extending across the width of the vehicle, an outboard side in the vicinity of the door sash facing to the outside of the vehicle, and an inboard side in the vicinity of the door sash facing toward the interior of the vehicle, the door sash having an upper portion extending in a vertical direction upward from a waist line of the door the door sash comprising:

a design portion extending in the vertical direction upward from a waist line of the door and having a design surface on the outboard side of the design portion; and a hollow portion connected to the design portion on an inboard side of the design portion and wherein the hollow portion is an extrusion mold formed of light metal extending in the vertical direction upward from a waist line of the door, and further wherein the design portion has a mounting portion extending in the vertical direction upward from a waist line of the door between the hollow portion and the design surface the mounting portion having a variable length along a horizontal cross-sectional shape that increases in the horizontal width-wise direction as it gets close to a waist line of a door, and the hollow portion and the design portion are connected to each other at the mounting portion of the design portion.

2. The door sash according to claim 1, further comprising: a glass run holder positioned on an outboard side of the door sash with respect to the hollow portion and configured to hold a glass run which a window glass comes into abutment with, the glass run holder being adjacent to the design portion, and a bracket configured to connect the glass run holder and the hollow portion.

3. The door sash according to claim 2, wherein the bracket is connected the glass run holder.

4. The door sash according to claim 2, wherein the bracket is the tongue-shaped strip formed by a cut in the glass run holder and configured to come into abutment with the hollow portion.

5. The door sash according to claim 3, wherein the bracket is a tongue-shaped strip formed by a cut in the glass run holder and configured to come into abutment with the hollow portion.

\* \* \* \* \*